United States Patent
Brunninger et al.

(10) Patent No.: US 7,739,355 B2
(45) Date of Patent: Jun. 15, 2010

(54) METHOD AND SYSTEM FOR CREATING A GRAPHIC USER INTERFACE FOR CONTROLLING, CONFIGURING AND/OR DIAGNOSING AN ELECTROPHOTOGRAPHIC COPYING OR PRINTING APPARATUS

(75) Inventors: Martin Brunninger, Forstinning (DE); Berthold Kathan, München (DE)

(73) Assignee: Oce Printing Systems GmbH, Poing (DE)

( * ) Notice: Subject to any disclaimer, the term of this patent is extended or adjusted under 35 U.S.C. 154(b) by 1246 days.

(21) Appl. No.: 10/531,791

(22) PCT Filed: Oct. 22, 2003

(86) PCT No.: PCT/EP03/11708

§ 371 (c)(1),
(2), (4) Date: Oct. 4, 2005

(87) PCT Pub. No.: WO2004/038577

PCT Pub. Date: May 6, 2004

(65) Prior Publication Data

US 2006/0227358 A1    Oct. 12, 2006

(30) Foreign Application Priority Data

Oct. 28, 2002    (DE) ................................ 102 50 148

(51) Int. Cl.
*G06F 15/16* (2006.01)
(52) U.S. Cl. .................... 709/218; 709/217; 709/219
(58) Field of Classification Search ......... 709/216–200, 709/227–228; 399/8, 81
See application file for complete search history.

(56) References Cited

U.S. PATENT DOCUMENTS

| 4,860,055 | A | * | 8/1989 | Ohira et al. ................... 399/81 |
| 4,998,835 | A | * | 3/1991 | Negishi et al. .............. 400/611 |
| 5,243,382 | A | | 9/1993 | Takano et al. |

(Continued)

FOREIGN PATENT DOCUMENTS

DE    197 35 947    2/1999

(Continued)

*Primary Examiner*—Thu Nguyen
*Assistant Examiner*—Nam Tran
(74) *Attorney, Agent, or Firm*—Schiff Hardin LLP (57) ABSTRACT

In a method or system for loading of program data for a graphical user interface for operation or for diagnosis of a printer or copier, first data are stored in a first storage region of a first data processing unit. The first data are transferred from the first data processing unit to a second data processing unit of an operating unit, the first data containing at least specifications about at least one program module necessary for generation of operation or diagnosis functions. With help of the second data processing unit, it is checked whether second data that contain the program module are contained in the second storage region of the second data processing unit. A version state of the program module stored as second data in the second storage region is compared with a version state of the necessary program module. Given non-existent second data in the second storage region and given inconsistent version states, the second data are transferred from a third storage region of the first data processing unit to the second data processing unit. Instructions of the program module are executed by the second data processing unit.

15 Claims, 10 Drawing Sheets

U.S. PATENT DOCUMENTS

| | | | |
|---|---|---|---|
| 5,412,779 A | | 5/1995 | Motoyama |
| 5,485,247 A | * | 1/1996 | Morishita et al. ............. 399/16 |
| 5,809,390 A | * | 9/1998 | Jackson ..................... 399/384 |
| 5,926,631 A | | 7/1999 | McGarvey |
| 5,960,204 A | * | 9/1999 | Yinger et al. ............... 709/221 |
| 6,241,239 B1 | * | 6/2001 | Oberhoffner et al. ........ 271/208 |
| 6,636,899 B1 | * | 10/2003 | Rabb et al. .................. 709/229 |
| 7,350,149 B1 | * | 3/2008 | Franceschelli et al. ...... 709/219 |
| 2001/0055492 A1 | | 12/2001 | Wood et al. |

FOREIGN PATENT DOCUMENTS

| | | |
|---|---|---|
| EP | 0 843 230 | 5/1998 |
| EP | 843230 A2 * | 5/1998 |
| EP | 1 189 135 | 3/2002 |
| EP | 1 202 160 | 5/2002 |

* cited by examiner

METHOD AND SYSTEM FOR CREATING A GRAPHIC USER INTERFACE FOR CONTROLLING, CONFIGURING AND/OR DIAGNOSING AN ELECTROPHOTOGRAPHIC COPYING OR PRINTING APPARATUS

BACKGROUND

The preferred embodiment concerns a method and a system for generation of a graphical user interface for an electrophotographic printing or copying system. Data for generation of a graphical user interface are stored in a storage region of a first data processing unit.

In known printers or copiers, a serial interface is provided for connection of a service and maintenance computer with which diagnostic tasks and adjustment tasks can be implemented. Individual components of the printer or copier have their own data interfaces, at which the service and maintenance computer for diagnostic, configuration and maintenance tasks can be connected via an interface converter. In known printers, the diagnosis and adjustment of these components can only occur via the respective data interface of the component. Due to the relatively low data transfer rates of these data interfaces, larger quantities of data would have to be read out from the printer or copier with the aid of exchangeable data media such as, for example, diskettes. Different programs that are respectively individually invoked and executed by the service and maintenance computer are necessary for evaluation of these error data, for diagnosing and maintenance of the components with their own data interfaces, and for diagnosis of the printer or copier via the serial interface. The necessary programs are installed on the service and maintenance computer, whereby different programs that are respectively stored as a separate program on a fixed disc of the service and maintenance computer are necessary for individual delivery states of individual components and of the printer or copier. Even the selection of the correct program requires significant expertise.

A control system for a printer or copier is known from U.S. Pat. No. 5,243,382, in which a portable maintenance device can be connected to a maintenance interface. The printer or copier first transfers data with state information of the printer or copier with the aid of a connection between the maintenance device and the printer or copier. Furthermore, second data that contain state information can be input to the maintenance device. At least one pair of items of stored control information can be output by the maintenance device based on the first and second state information. Furthermore, from U.S. Pat. No. 5,243,382 it is known to transfer the stored data to a data processing system.

Furthermore, from the document EP 0 843 230 A1 a system is known for remote maintenance via the World Wide Web of a peripheral device connected with a network. In this system, a Java applet is downloaded given the first invocation call by a server to a data processing system, and there it is cached by a browser program module for a repeated invocation by the same HTML document. A graphical user interface is generated with the aid of the HTML document, whereby the HTML document is also transferred to the data processing system. A method and an arrangement for implementation of monitoring and management functions in networks with monitored components is known from the document DE 197 35 947 A1 and a data transfer over the Internet with the aid of program modules based on the programming language Java is known from the document U.S. Pat. No. 5,926,631 A1.

SUMMARY

It is an object to specify a method and a system for generation of a graphical user interface for an electrophotographic printing or copying system via which a user interface adapted to the respective printing or copying system can be simply generated and at least one operating function and/or diagnosis function is provided for operation or for diagnosis of the printing or copying system.

In a method or system for loading of program data for a graphical user interface for operation or for diagnosis of a printer or copier, first data are stored in a first storage region of a first data processing unit. The first data are transferred from the first data processing unit to a second data processing unit of an operating unit, the first data containing at least specifications about at least one program module necessary for generation of operation or diagnosis functions. With help of the second data processing unit, it is checked whether second data that contain the program module are contained in the second storage region of the second data processing unit. A version state of the program module stored as second data in the second storage region is compared with a version state of the necessary program module. Given non-existent second data in the second storage region and given inconsistent version states, the second data are transferred from a third storage region of the first data processing unit to the second data processing unit. Instructions of the program module are executed by the second data processing unit.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

A first aspect of the preferred embodiment concerns a method for loading of program data for operation and/or for diagnosis of an electrophotographic printer or copier. First data are stored in a first storage region of a first data processing unit of a printer or copier. The first data are transferred from the first data processing unit to a second data processing unit of an operating unit. The first data contain at least specifications about at least one program module necessary for generation of operating and/or diagnosis functions. With the help of the second data processing unit, it is checked whether second data that contain the program module are contained in a second storage region of the second data processing unit. Given nonexistent second data in the second storage region, the second data are transferred from a third storage region of the first data processing unit to the second data processing unit. Instructions of the program module are executed by the second data processing unit.

Via this method of the preferred embodiment for loading of program data, it is achieved that at least the second data can be stored in an operating unit, whereby with the aid of the first data it can simply be checked whether the necessary program module is contained in the second storage region. Only when the necessary program module is not contained in the second storage region are the second data that contain the program module transferred from the first data processing unit to the second data processing unit. The necessary transfer time, in particular for loading of the second data, is thereby significantly shortened, primarily when data lines with a low data transfer rate are used for data transfer.

A second aspect of the preferred embodiment concerns a system for loading of program data for operation and/or for diagnosis of an electrophotographic printer or copier. The system contains a first data processing unit of the printer that is connected with a second data processing unit of an operating unit via a data line. First data that at least contain specifications about at least one program module necessary for generation of operating and/or diagnosis functions can be transferred from the first data processing unit to the second data processing unit. The second data processing unit checks whether second data that contain the program module are stored in a second storage region of the second data processing unit. In nonexistent second data in the second storage region, the second data are transferred from a third storage region of the first data processing unit to the second data processing unit. The second data processing unit executes instructions of the program module. It is thereby achieved that the second data do not have to be transferred from the printer or copier when they are already stored in a storage region of the operating unit. Wait times for loading of the data are reduced.

A third aspect of the preferred embodiment concerns a method for generation of a graphical user interface for an electrophotographic printing or copying system. First data for generation of a graphical user interface are stored in a storage region of a first data processing unit of the printing or copying system. The first data are transferred to a second data processing unit of an operating unit that is connected with the first data processing unit via a data line. The first data are processed by the second data processing unit. The second data processing unit executes a display program module that processes the first data. Second data that are transferred to the second data processing unit are stored in a second storage region of the first data processing unit. The second data are processed by the second data processing unit, whereby at least one operating function and/or diagnosis function is provided for operation or for diagnosis of the printing or copying system.

Via the method according to the third aspect of the preferred embodiment, it is achieved that a graphical user interface for operation and/or for diagnosis of the printing or copying system is generated on an operating unit without an installation of special software and an adaptation of program modules being necessary. A printing or copying system-specific adaptation of the operating unit can thus be foregone. A selection from a plurality of programs of a program adapted for the printing or copying system is also not necessary.

The data necessary for generation of the graphical user interface are stored in the printing or copying system itself. These data are already adapted to the type and the output state of the printing or copying system or of components of the printing or copying system, whereby a correct operation, correct configuration and/or a correct diagnosis of the printing or copying system is possible in a very simple manner.

A fourth aspect of the preferred embodiment concerns a system for generation of a graphical user interface for an electrophotographic printing or copying system. A first data processing unit of the printing or copying system contains a first storage region in which are stored first data for generation of a graphical user interface. The first data are transferred to a second data processing unit of an operating unit, whereby the second data processing unit is connected with the first data processing unit via a data line. The second data processing unit processes the first data with the aid of a display module that generates a graphical user interface. Second data that contain program elements are stored in a second storage region of the first data processing unit. The second data are transferred to the second data processing unit via the data line. The second data processing unit processes the second data and provides at least one operating and/or diagnosis function for operation or for a diagram of the printing or copying system.

Via this system preferred embodiment it is achieved that the operating unit requires not program elements and program modules specially adapted to the printing or copying system in order to output a user interface or, respectively, user interfaces adapted for the respective printing or copying system. Both the data for generation of a graphical user interface and program elements for operation and/or for diagnosis of the printing or copying system are stored in a storage region of the printing or copying system, whereby both the graphical user interface and the program elements are tuned to the type and/or the output state of the printing or copying system.

Figure 1:
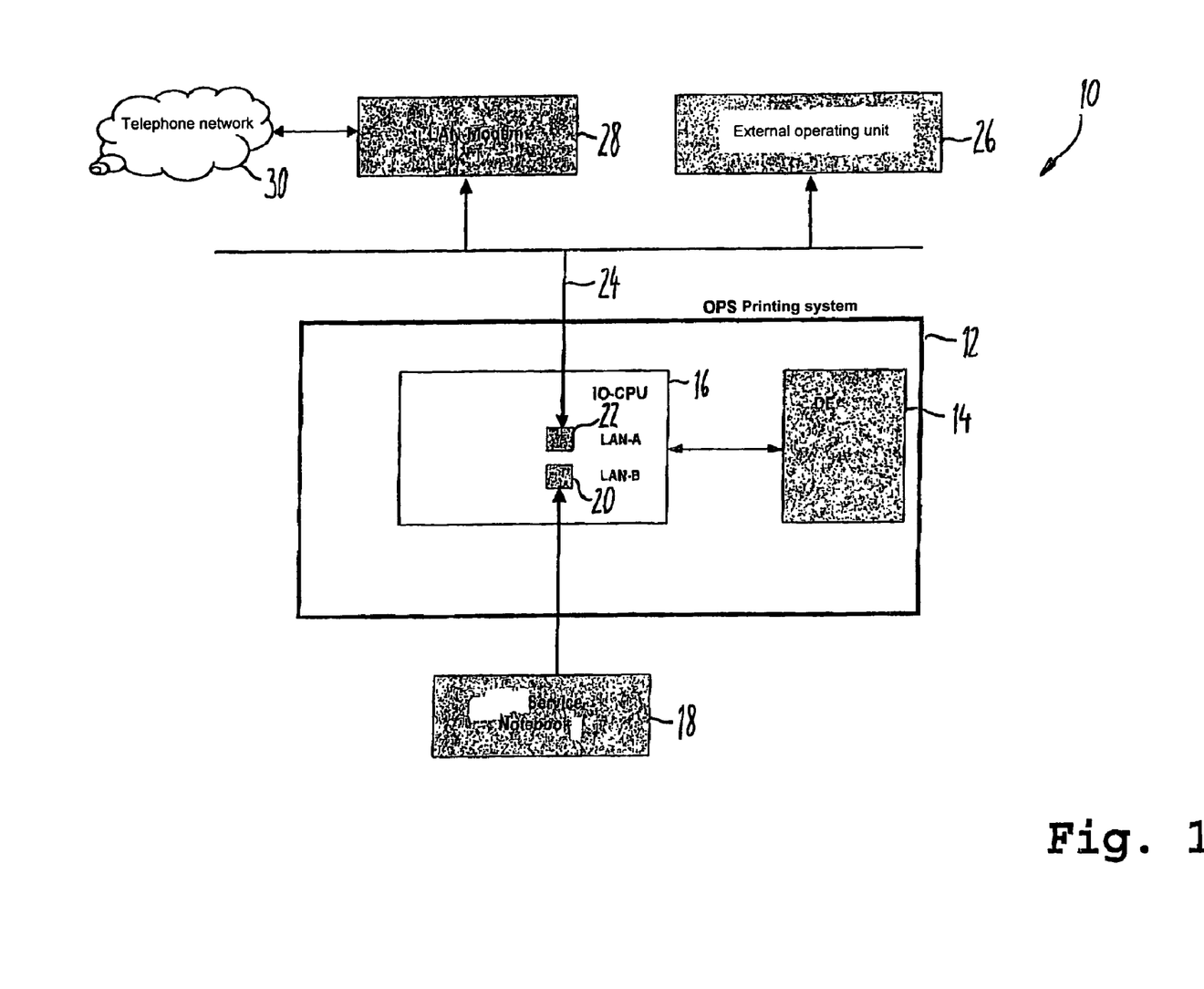
FIG. 1 is a block diagram of a system with a printer and a service and maintenance computer according to a first exemplary embodiment of the invention.

A block diagram of a system 10 for maintenance, configuration and diagnosis of a printer 12 with the aid of a service and maintenance computer 18 is shown in FIG. 1. The printer 12 contains a printer controller 14 and an input and output controller 16. The device controller 14 contains all information and measurement values necessary for control, maintenance, configuration and error analysis as well as for diagnosis of the printer 12. The device controller 14 is connected with the input and output controller 16. A first service and maintenance computer 18 can be connected with the printer 12 via the first network connection 16. The service and maintenance computer 18 is, for example, a service notebook that a service technician connects with the input and output controller 16 of the printer 12 given service assignments on site at the printer 12, for example at a customer. The connection preferably occurs with the aid of a network connection to a local area network (LAN). For this, the service technician connects the service notebook 18 with a first network connection 20 of the input and output controller 16 with the aid of a network cable, what is known as a patch cable. Furthermore, the input and output controller 16 comprises a second network connection 22 that is connected with a network 24 through the printer 12. An external control panel 26 and a LAN modem 28 are connected with the printer 12 via the network 24. The LAN modem 28 is connected with a telephone network 30, whereby a data connection with a service center of the printer manufacturer and with a telephone connection of a service technician can be established via the LAN modem 28. The telephone connection of the service technician and the service center, which is respectively connected with the telephone network 30, is not shown in FIG. 1.

Operating personnel can implement operator control actions with the aid of the external control panel. The operating personnel can thus, for example, input paper parameters, position print images, establish print qualities and coordinate the execution of print jobs. With the aid of the service notebook 18, both the operator control actions that operating personnel can execute via the external control panel 26 can be implemented and setting values and parameters of the printer 12 can be changed and storage regions and registers of the device controller 14 can be output and written with new data. In the same manner as with the help of the service notebook 18, respective functions for diagnosis and for adjustment of print parameters are available to a service technician given a connection of a further service notebook to the telephone connection and to a service and maintenance computer in a service center of the printer manufacturer that is connected with the telephone network via a modem. Thus a remote maintenance, remote configuration and remote diagnosis of the printer 12 is possible via the telephone network 30 and a local diagnosis and maintenance is possible with the aid of the service notebook 18 connected with the printer 12.

Figure 2:
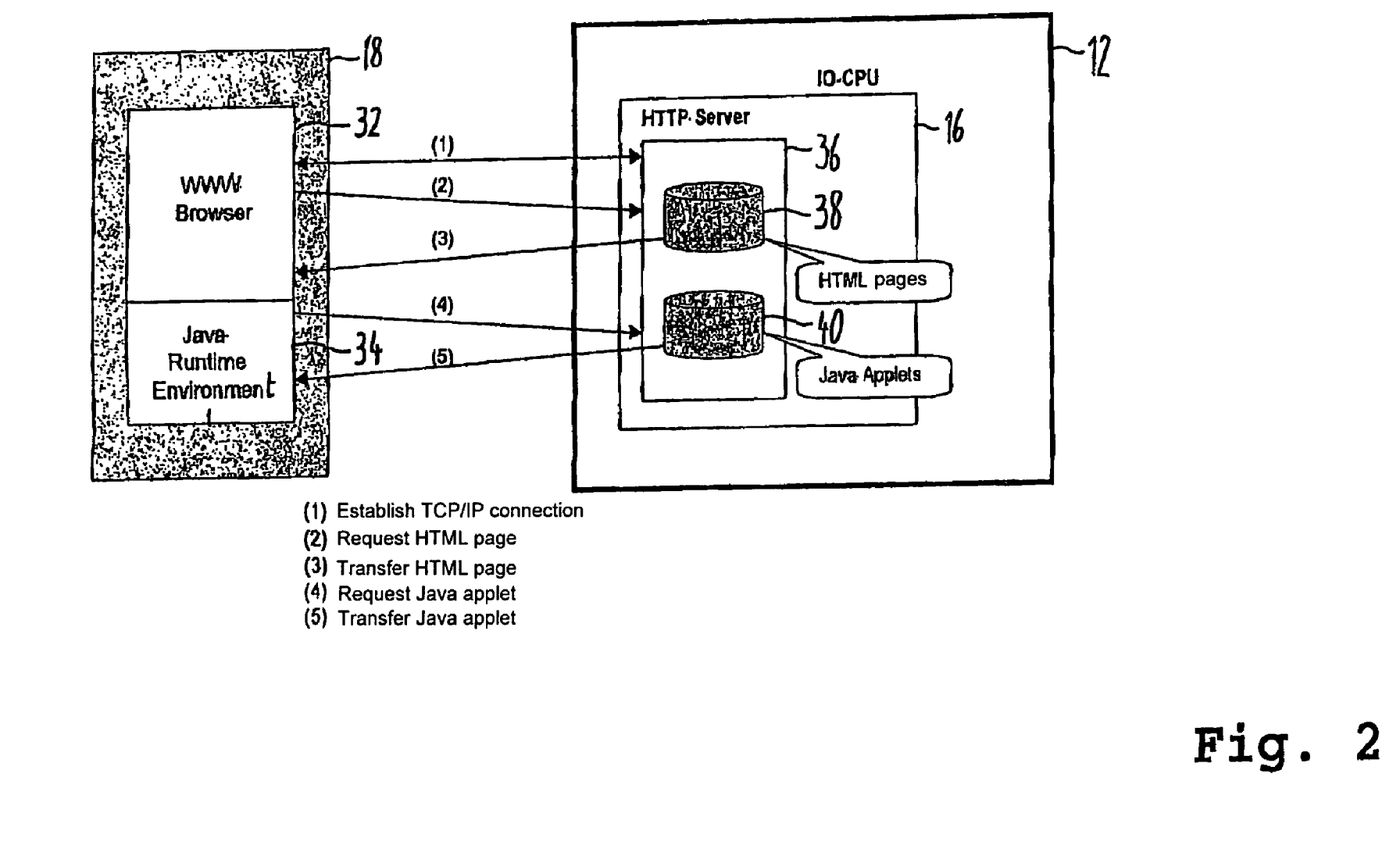
FIG. 2 is a block diagram with a detail view of an input and output controller of the printer and of the service and maintenance computer according to FIG. 1.

A section of the block diagram according to FIG. 1 is shown in FIG. 2 with the service notebook 18 and the input and output controller 16. Identical elements have the same reference characters. In addition to an operating system, the service notebook 18 contains a display program module 32 that is also designated as a browser program module. The browser program module 32 contains what is known as a Java runtime program environment via which it is possible to execute program elements that have been created in the programming language Java, whereby the data generated by these program elements are output with the aid of the browser program module 32.

The input and output controller 16 contains what is known as an HTTP server 36 that contains at least one data storage region 38 in which are stored hypertexts and elements for generation of what are known as Hypertext Markup Language pages (HTML pages), whereby the stored data preferably contain what are known as hypertexts for page description. A graphical user interface in which a plurality of user interfaces can be selected, preferably via a menu, is generated with the aid of these HTML pages. The user interfaces are output in a section provided in the graphical user interface.

Furthermore, the HTTP server 36 contains a storage region 40 in which program elements are stored that have been created in the programming language Java. Such a program element is also designated as a Java applet. The program data of the Java applet as well as class data that are necessary for execution of the Java applet and program data of program parts that are invoked by the Java applet are preferably stored in archives, what are known as jar archives. Data that are necessary for generation of a function or of a group of functions are preferably stored in an archive. In other embodiments, storage region 40 also stores Java applications as well as program elements that are designated as ActiveX program elements. A plurality of archives with Java applets or ActiveX elements are preferably contained in the storage region 40. An archive with program data for authentication, an archive with program data for communication control between the service notebook 18 and the input and output controller 16 as well as further archives with program data for provision of operation, configuration and diagnosis functions are preferably provided.

The transfer of data with setting values and printer parameters between printer 12 and service notebook 18 preferably occurs with the aid of a Remote Method Invocation (RMI) communication. With the help of such an RMI communication, it is also possible to access objects of the device controller 14 and a databank (not shown) of the printer 12, preferably a management information base (MIB) of the printer 12. With the aid of the Remote Method Invocation (RMI) communication technique, data can be transferred between objects defined in the programming language Java. The Remote Method Invocation (RMI) communication technique is described in detail in the documents U.S. Pat. No. 6,571,274 B1 as well as U.S. Pat. No. 6,334,146 B1, whose contents are thus incorporated by reference into the present specification. If SNMP instructions are transferred over a wide area network (WAN) as data with the aid of the RMI communication technique, the manipulation of these SNMP instructions is possible via the relatively secure data transfer with the aid of the RMI communication, since (with the aid of the RMI communication) data can be transferred directly between the objects defined in the programming language Java. The SNMP instructions are thus transferred as useable data and cannot be viewed by third, unauthorized users.

Program data or, respectively, archives with program data for diagnosis of a paper input unit, for diagnosis of a paper path controller, for diagnosis of a paper output unit or for diagnosis of a printing unit can be stored in the storage region 40. Furthermore, archives with program data for access to an event registration and archives with program data for access to an error storage are contained in the storage region 40.

A connection is established between the service notebook 18 and the network connector 20 via the network connection with the aid of a Transmission Control Protocol/Internet Protocol (TCP/IP). An HTML page is requested from the HTTP server via a preset in the browser program module 32. The data of the HTML page are read out from the storage region 38 and transferred to the browser program module 32. A Java applet is requested at the HTTP server 36 via execution of the transferred hypertext of the HTML page. The HTTP server 36 reads data from the storage region 40 that contain program data of the Java applet. The program data of the Java applet are transferred to the service notebook 18 and executed by the Java runtime program environment 34.

In the simplest case, the HTML page or the transferred hypertext contains only the instruction for downloading of one or more Java applets. The graphical user interface, display elements and operating elements as well as the operating, configuration and diagnosis function are then realized (as already mentioned) with the aid of the java applet program elements.

In other exemplary embodiments, given the establishment of the TCP/IP connection it is checked whether the service technician is authorized to receive access to data of the HTTP server 36 with the service notebook 18. The Java applet generates the graphical user interface with the aid of the browser program module 32 and establishes a logical connection with an RMI server 36 with the aid of an RMI communication. The service notebook 18 is an RMI client in the RMI communication. The external operating unit 26 and the service computer connected over the telephone network 30 are also RMI clients. A file transfer protocol (FTP) for data transfer is used for transfer of mass data such as, for example, error data and what are known as trace data. For this, a special FTP server is provided in the input and output controller 16, which FTP server is, however, only activated for data transfer and is otherwise not active for data protection reasons.

To activate the FTP server, with the help of the RMI communication data are transferred via which the input and output controller 16 generates what is known as a SNMP command (SNMP=Simple Network Management Protocol). SNMP commands that are generated with the aid of the RMI communication between the service notebook 18 and the printer 12 are likewise used for transfer of instructions to control units of the printer 12, the readout of parameters from the printer 1, such as sensor values, error states and status information. Variables, parameters, command registers and status registers contained in the already-mentioned management information base (MIB) can also be accessed with the aid of SNMP commands, whereby an object identifier (OID) is associated as an addressing address with each element of the management information base. The SNMP commands are generated in the RMI server with the help of the transferred RMI commands and RMI data. Thus no direct accesses are possible with external SNMP commands to the MIB of the printer 12. It is thereby ensured that unauthorized people and control units have no access to the controllers 16 and the database of the printer 12. However, the data are directly transferred in the transfer of the data with the aid of the FTP protocol, whereby special measures are then taken in order to prevent an unauthorized access.

Figure 3:
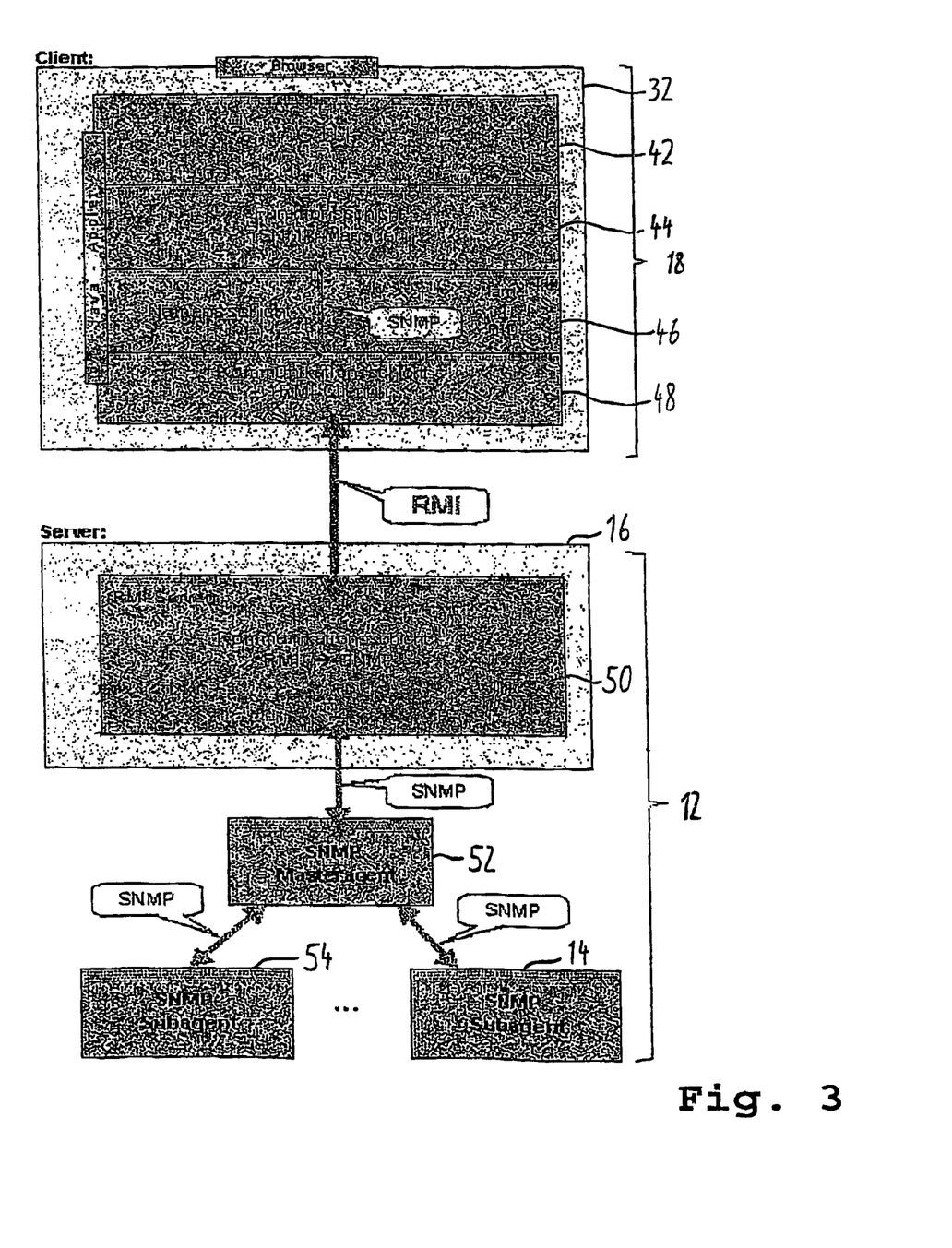
FIG. 3 is a block diagram that shows the data transfer and communication structure between the service and maintenance computer and the printer according to FIG. 1.

A block diagram is shown in FIG. 3 in which is shown the RMI/SNMP communication between the printer 12 and the service notebook 18. As already explained in connection with FIG. 2, the communication between the service notebook 18 and the printer 12 occurs via a network connection with the aid of an RMI communication. The display program 32 of the service notebook 18 operates a Java applet 48 for generation of an RMI client of an RMI communication. The Java applet 48 determines the SNMP data from the data transferred with the aid of the RMI communication. The SNMP data in turn contain data with which an OID address is respectively associated, for example variable values, measurement values and setting values of the printer 12. The data of individual variables are addressed in a management information base (MIB) with the aid of the OID address. A variable name is then associated with these data by a program function 46, dependent on the OID address. The transferred data are requested and processed by a program function 44 with the aid of the variable names.

The program function 44 serves as an SNMP manager for execution and for generation of SNMP commands as well as for caching of data. The data determines with the aid of the program function 44 and SNMP commands are converted into display data (that are output on a display unit of a service notebook 18) with the aid of a program function 42 for generation of a graphical user interface.

Furthermore, operator control actions and inputs of setting values that are then converted into SNMP commands with the aid of the program function 44 can occur via the graphical user interface. Variable addresses, i.e. OID addresses, are correspondingly associated by the program function 46 with the variable names contained in these commands, whereby the data for generation of the SNMP commands are transferred to the printer 12 together with the variable addresses with the aid of the RMI communication. The data for generation of the SNMP commands in particular contain RMI commands. The input and output controller 16 of the printer 12 contains a program module for generation of SNMP commands from the data transferred with the aid of the RMI communication. The SNMP commands thereby also contain data with setting values. The SNMP commands in particular comprise a get command for retrieval of data from the management information base, a set command for modification of data in the management information base and a trap command for direct transfer of information to a SNMP agent or a SNMP subagent. The SNMP agents are respectively contained as program elements in control units of the printer 12 such as, for example, the device controller 14. The program data of a program function 42, 44, 46 are respectively contained in an archive and can thus be individually transferred, executed and stored.

The input and output control unit 16 transfers the SNMP commands to a SNMP master agent 52 that, with the help of the address associated with the respective command, forwards them to the corresponding control unit in which an element with this address is stored. This forwarding of the command to the respective control unit, of which the control unit 54 and the control unit 14 are shown in FIG. 3, is also designated as routing.

The SNMP agents 52, 54, 14 as well as the variables and data administered with the aid of the SNMP agents are preferably hierarchically organized such that an address structure according to the structure of the corresponding SNMP agents is associated with them, whereby the storage location of the respective variables can be simply found with the aid of the OID address. Both diagnosis functions of the individual control units 14, 16, 52, 64 can be invoked with the aid of the SNMP commands and operator control actions can be executed. The data transfer between the graphical user interface 42 and the control units 14, 16, 52, 54 of the printer 12 thus occurs with the aid of SNMP commands that are transferred or generated with the aid of an RMI communication at least between the printer 12 and the service notebook 18.

Figure 4:
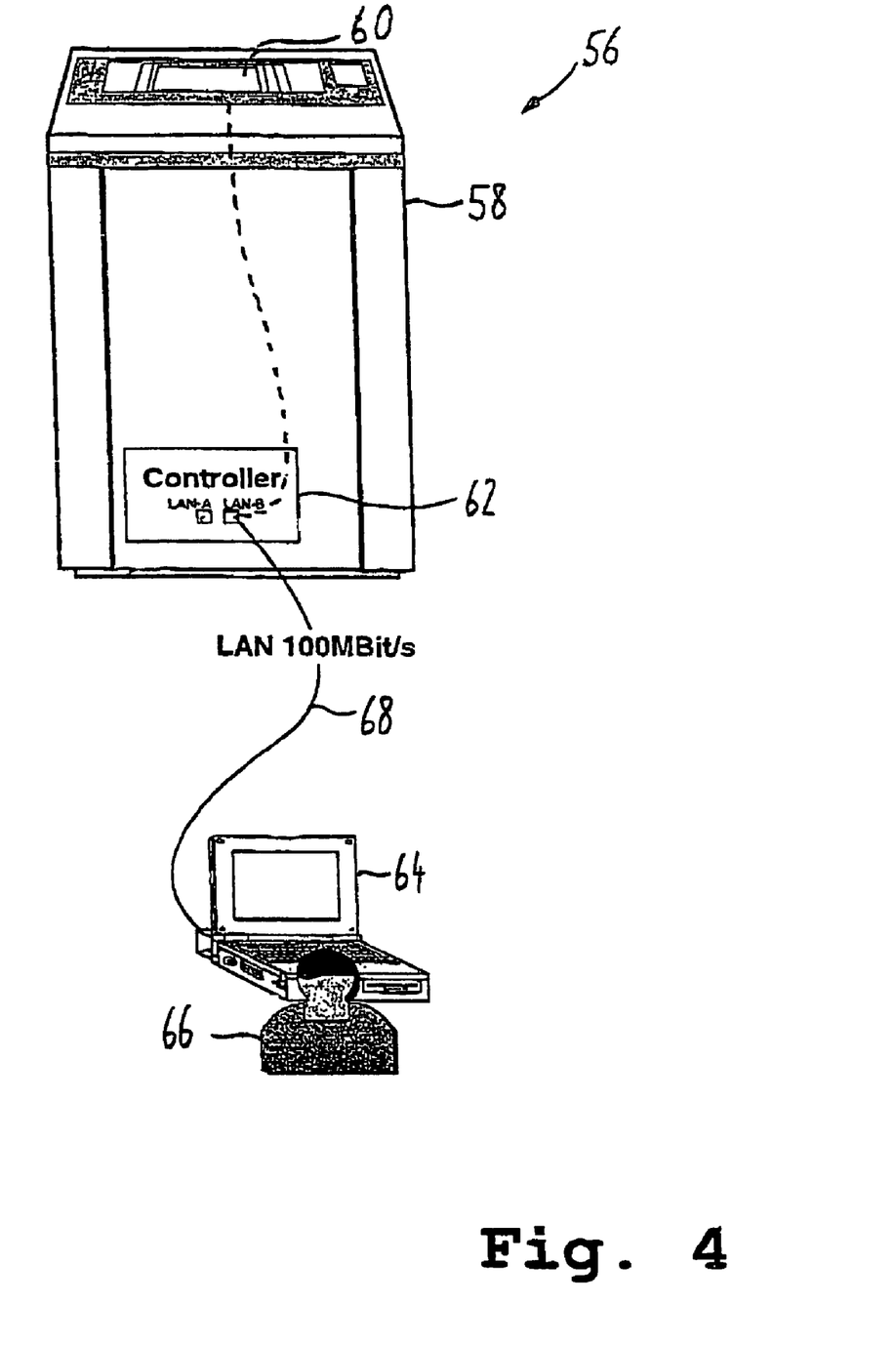
FIG. 4 is an arrangement of a printer and a service and maintenance computer according to a second exemplary embodiment of the invention.

A system 56 for maintenance, configuration, diagnosis and operation of a printer 58 is shown in FIG. 4. The printer 58 contains an internal control panel 60 that is connected with an input and output controller 62 of the printer 58. Furthermore, a service notebook 64 of a service technician 66 is connected with the input and output controller 62 of the printer 58 via a local area network connection (LAN) 68.

Figure 5:
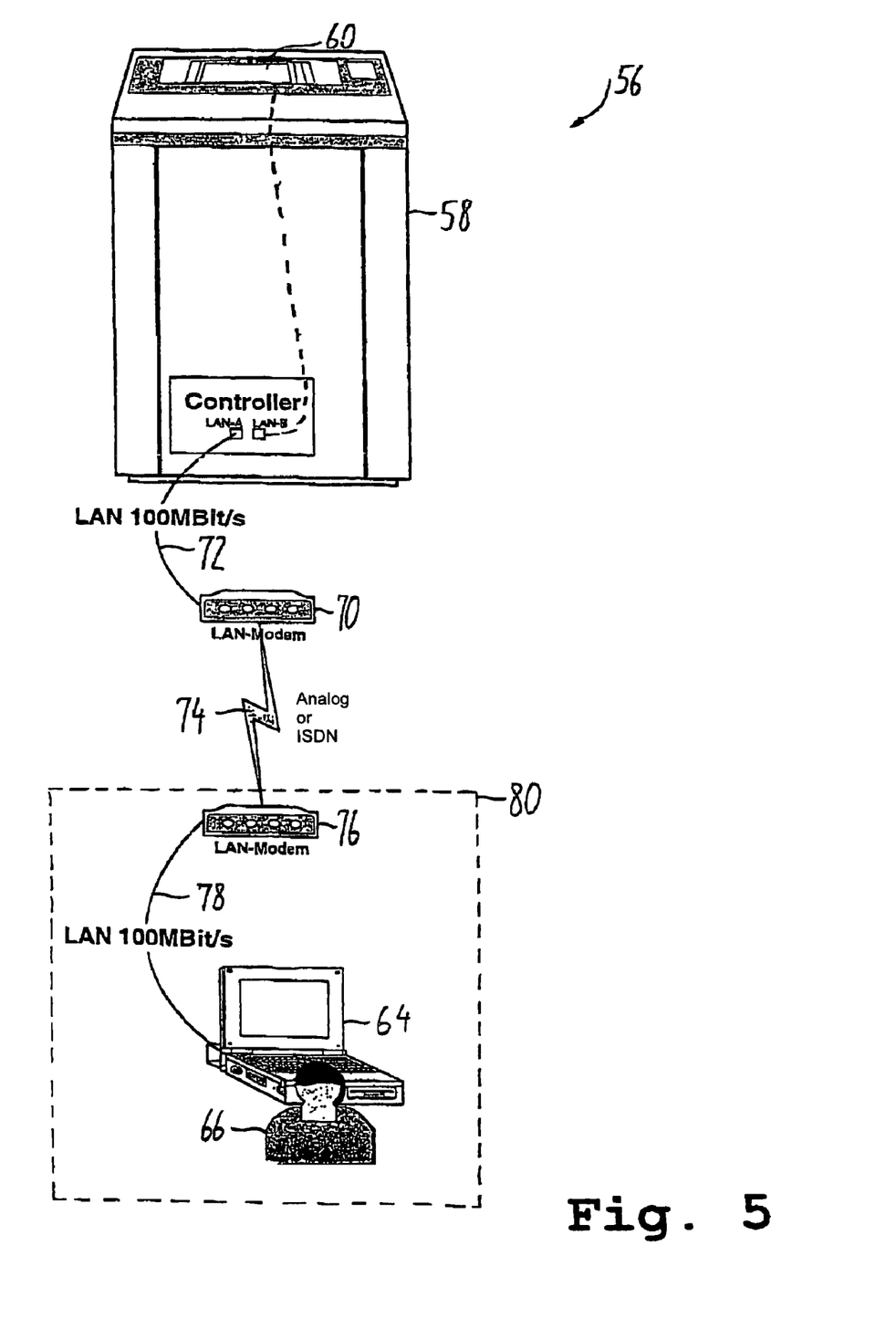
FIG. 5 is an arrangement of the printer and of the service and maintenance computer according to FIG. 4, whereby the service and maintenance computer is connected with the printer via a remote data transfer connection.

The system 56 according to FIG. 4 is shown in FIG. 5, whereby a LAN modem 70 is connected with the input and output controller 62 via a LAN network connection 72. What is known as a point-to-point connection is established with a second LAN modem 76 via a telephone network 74 with the aid of the LAN modem 70. The telephone connection 74 is alternately an analog telephone connection or an ISDN telephone connection. A service notebook 64 of the service technician 66 is connected with the LAN modem 76 via a network connection 78. The LAN modem 76, the service notebook 64 and the service technician 66 are located in a service center 80 of the printer manufacturer. With the aid of the service notebook 64, the service technician 66 can implement the same operating, configuration, diagnosis and setting operations as he can implement with a direct network connection 68 between the printer 58 and the service notebook 64. However, given a connection via the telephone network 74 the data transfer rate is significantly less than given a direct network connection 68 between the service notebook 64 and the printer 58.

Figure 6:
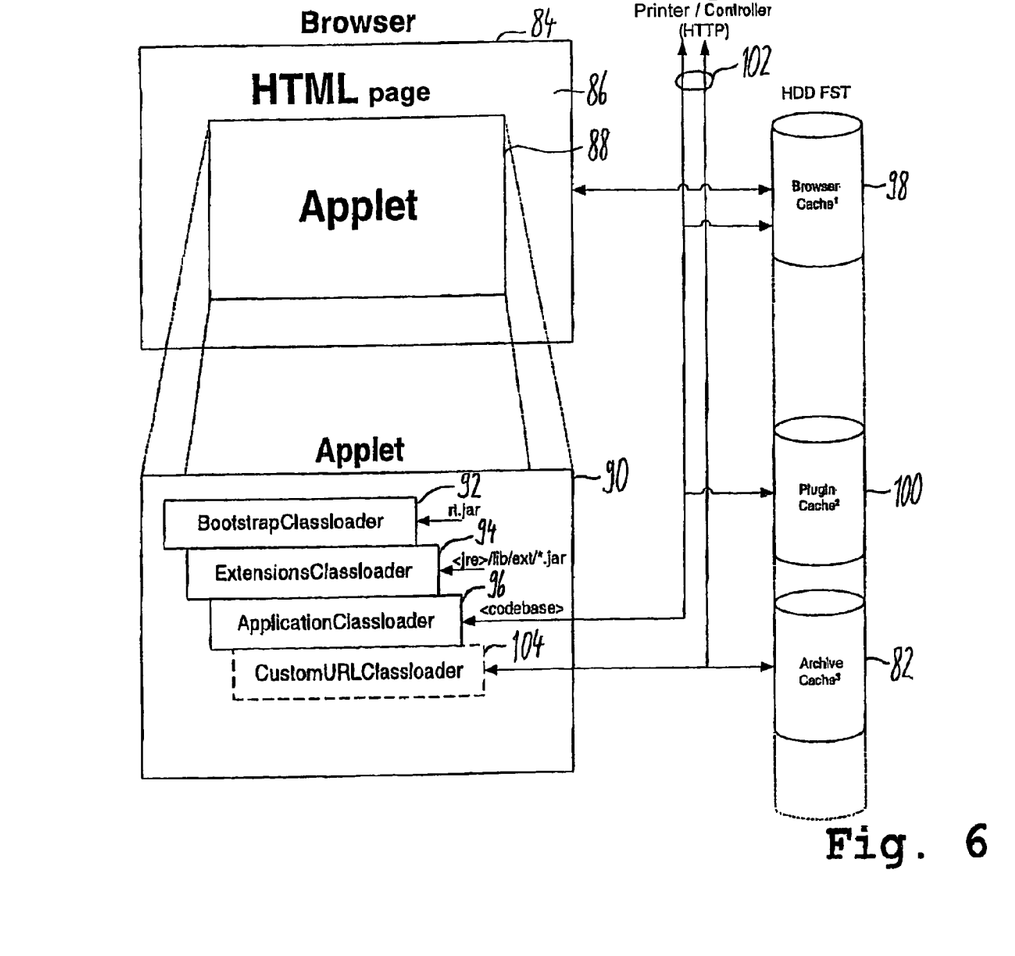
FIG. 6 is a block diagram in which the access of a display program module to program elements is shown.

A block diagram for administering and locating data contained in jar archives is shown in FIG. 6. In connection with the FIGS. 2 through 5, it has already been explained how Java applets and further program data contained in jar archives are executed with the aid of a Java runtime program environment of the browser program module 32. In the exemplary embodiment according to FIG. 2, the Java applets are transferred from the storage region 40 to the service notebook 18 with the aid of jar archives. In the arrangement shown in FIG. 6, jar archives can be stored in an archive cache region 82 of the service notebook 64. The arrangement according to FIG. 6 contains a browser program module 84 for output of a graphical user interface 86. At least parts of the graphical user interface 96 are generated via execution of a Java applet 88.

The browser program module 84 executes a hypertext of an HTML page in which is contained a program call of a Java applet 88. After the call of the Java applet 88, it is executed with the aid of the Java runtime program environment 90 (which is also designated as a Java Runtime Environment). What are known as classes made up of at least one jar archive are loaded for execution of the Java applet 88. For the case that the Classloader does not find the class in a default archive, the request is transferred for the downloading of a hierarchically subordinate Classloader that then searches for the requested class in a further preset index. The Java runtime program environment contains a BootstrapClassloader 92 for loading of classes that are contained in a basic configuration of the Java runtime program environment 90. An ExtensionClassloader 94 serves for loading of classes that expand the functional scope of the basic classes and whose access rights are not limited by a right concept contained in the Java runtime program environment 90. An ApplicationClassloader 96 is also provided that serves for loading of applet- or application-specific classes.

The classes that are loaded with the ApplicationClassloader 96 have been specially created for the application or for the applet and are not contained in the basic version of the Java runtime program environment 90. The ApplicationClassloader 96 serves for loading the archive data and source data of all sources and archives contained in the Java applet 88. Furthermore, a CustumURLClassloader 104 is provided that is provided in the preferred embodiment in addition to the BootstrapClassloader 92, the ExtensionClassloader 94 and the ApplicationClassloader 96. The CustumURLClassloader 104 serves for the loading of applet- or application-specific classes and program data that are stored in storage region 82 that can be preset. With the help of the CustumURLClassloader 104, it is possible to read out these classes from any storage region that can be preset, for example from indexes 82, without the limitations in the administration and in the access to the classes that exist in other Classloaders.

Upon access to a class administered by the CustumURLClassloader 104, a request of this class is first supplied to what is known as a BootstrapClassloader 92 that searches the preset archive for the class. If the desired class is not contained in the present archive, a further archive is subsequently searched through for the class with an ExtensionClassloader 94. If the class is also not contained in this archive, a storage region is subsequently searched for the requested class by an ApplicationClassloader 96. The ApplicationClassloader 96 has access both to a browser cache 98 and a plug-in cache 100.

Both the archive cache 82, the browser cache 98 and the plug-in cache 100 are contained in a fixed-disc storage of a data processing unit, whereby the data processing unit serves as an operating unit and as a service and maintenance computer of the printer, with which service and maintenance computer a data processing unit of the printer is connected via a network connection 102. The service and maintenance computer also contains the computer program module 84 with the Java runtime program environment 90. Data, classes, archives and Java applets that are transferred from a printer connected via the network 102 to the service and maintenance computer can be cached in both the browser cache 98 and in the plug-in cache 100.

As already mentioned, the ApplicationClassloader 96 has access to the browser cache 98 and to the plug-in cache 100. However, the data that are transferred from the printer over the network 102 are stored in the browser cache 98 and in the plug-in cache 100 with reference to the network address of the printer from which they have been transferred. Furthermore, the data stored in the browser cache 98 and in the plug-in cache 100 are deleted after a preset time span. Given a storage of the invoked Java applet in the browser cache 98 of in the plug-in cache 100, identical archives that contain the requested class must be transferred again to the service and maintenance computer given a change of the network address of the printer, for example given a connection via the network 102 of the service and maintenance computer with a second printer identical in construction.

Both the transfer of an identical archive and the caching of the archive with reference to a second network address in the browser cache 98 or in the plug-in cache 100 is time-consuming and consumes storage space. In particular only a data transfer with low data transfer rate is possible over the network 102. When, for example, a telephone network similar to the telephone network according to FIG. 5 is provided between the service and maintenance computer and the printer, the data transfer can last multiple minutes and, given storage-intensive archives, up to multiple hours. If the archive with the requested class is not found upon searching of the caches 98 and 100 by the ApplicationClassloader 96, a CustomURLClassloader 104 is invoked in the preferred embodiment with which the archive cache 82 is associated.

In the archive cache 82, the program data are stored independent of the network address of the printed from which they were transferred. The archive cache 82 can also comprise the storage region of a CD-ROM on which a plurality of archives of different types of printers and different versions of the same printer types are stored. As an alternative or in addition to this, a plurality of archives are stored on the fixed disc with classes, Java applets and/or Java applications for operation and for diagnosis of various printers. Given invocation of the CustomURLClassloader 104, the archive cache 82 is searched for the archive with the class invoked by the browser program module 84. If the respective archive is stored in the archive cache 82, the archive is read out from this archive cache 82 and transferred to the Java runtime program environment 90 that, together with the browser program module 84, opens the archive and determines the necessary data, i.e. the requested class data. With these class data, the executed Java applet 88 can provide necessary operating and/or diagnosis functions in the graphical user interface 86 for diagnosis, configuration or operation of the printer.

However, if the CustomURLClassloader 104 determines that no archives with the class data are contained in the archive cache 82, the archive is requested from the printer connected over the network 102 and transferred from this to the Java runtime program environment 90 of the service and maintenance computer, whereby the archive is stored in the archive cache 82 after the transfer. Given a new connection with a printer in which the same archive is required, the archive is then read out from the archive cache 92 by the CustomURLClassloader 104 and a requested class or a Java applet is executed by the Java runtime program environment 90. A new transfer of the archive from the connected printer is then not necessary, even when the printer has a different network address.

The archives advantageously contain program data of Java applets or of parts of a Java applet, class data or other data. These archives contain version information of the archive and are signed in order to prevent a manipulation of the archive data and thereby to prevent a manipulation of the printer and the operating unit.

If no data or only a small data quantity are transferred between the printer and the service and maintenance computer given an existing network connection 102, the CustomURLClassloader 104 can request from the printer further archives that are currently not necessary, and store in the archive cache 82 those that are not yet contained in the printer and in the archive cache 82. Archives are advantageously requested whose designations are contained in the hypertext of the HTML page 86 or in an already-executed Java applet 88.

A jar archive that contains a primary loader with which further classes and program data that are necessary for generation of the graphical user interface 86 are specifically downloaded is preferably first loaded and executed by the printer or from the archive cache 84 by the browser program module 32. A jar archive with an authentication procedure is subsequently loaded for authentication of the data processing system by the printer. A jar archive with Java applets for communication is subsequently loaded between the printer and the service and maintenance computer. Finally a jar archive with data for generation of the basic functions of the graphical user interface 86 is loaded and executed.

After invocation of individual diagnosis and operating functions via the graphical user interface 86, jar archives necessary for provision of the diagnosis or of the operating function are then downloaded from the archive cache 82 or from the printer. The hypertext of the HTML page or a jar archive that has been transferred from the printer to the service and maintenance computer preferably contains the designations of all jar archives necessary for possible operating and diagnosis functions. These data are alternatively contained in the primary loader. A Java applet preferably contains all program steps necessary for provision of the operating or diagnosis function in order to prevent dependencies between individual archives. A time-consuming downloading of further archives that are not inherently necessary or that are not yet necessary is thereby prevented.

In other exemplary embodiments, information about the design and content of the graphical user interface 86 are stored in the printer, in particular about the design of a menu tree, the content of lists and output fields. This stored information is used to accelerate the construction of the graphical user interface 86 given a regeneration of a graphical user interface 86, in that for the time being only the stored information are transferred from the printer to the service and maintenance computer or to an operating unit. Thus, for example, given a new service assignment information stored in this printer can be accessed and a graphical user interface 86 can be built with the stored information.

The loading of individual jar archives from the cache 82 and from the printer can be omitted up to a point in time at which the respective function is then concretely required, or possibly even when the corresponding function is not necessary in the respective operation and/or diagnosis of the printer. Given storage of the information, additional version data are preferably stored that enable it to determine the timeliness of the stored information. The operating, configuration and diagnosis functions in particular concern parameter settings of the printer, the adjustment of error limit values, the adjustment of voltages between individual components of an image generation unit of the printer, status settings of the printer, light barrier test routines, motor start routines and valve test routines.

Figure 7:
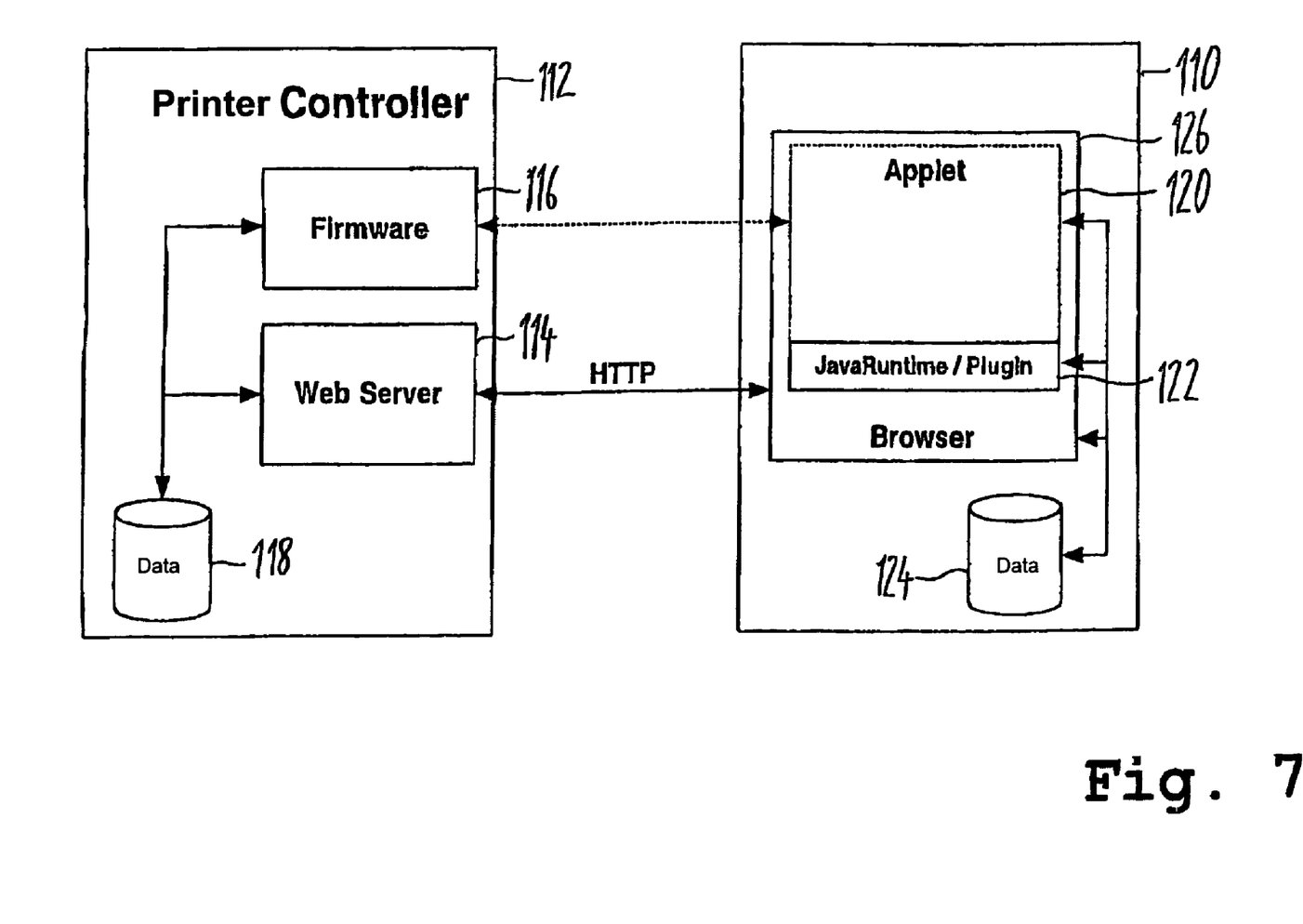
FIG. 7 is a block diagram with a data processing unit of a service and maintenance computer and a printer controller, whereby the data transfer for transfer of display data is shown.

A block diagram with a data processing unit 110 and a printer controller 112 is shown in FIG. 7, in which are shown elements for data transfer between the printer controller 112 and the data processing unit 110. The data processing unit 110 is, for example, a service notebook or an operating unit of the printer. The printer controller 112 contains a web server 114 similar to the HTTP server 36 according to FIG. 2. Furthermore, the printer controller 112 contains a firmware 116. Via execution of the firmware 116 by the printer controller 112, at least one part of the components of the printer is controlled and an RMI server is generated for RMI communication between printer controller 112 and data processing system 110. Furthermore, measurement data and setting data of the printer are determined with the aid of the firmware 116. The measurement data and the setting data are contained in a storage region 118 of the printer controller 112 or in storage regions of control units (not shown) of the printer controller 112. The firmware reads these measurement data from the storage region 118 and/or from the control units and, with the aid of the RMI server, provides these data for invocation by the data processing system 110. With the help of a browser program module 120, the data processing unit 110 generates a graphical user interface via which data (in particular measurement and setting values as well as operating states and error data) can be displayed.

The browser program module 120 contains a Java runtime program environment provided with the aid of a plug-in program module program environment 122. With the aid of the program environment 122, the browser program module 120 executes program elements such as, for example, Java applets. Data, class data as well as the program data to be executed of a plurality of applets are contained in the archives in a storage region 124 of the data processing unit 110. The storage region 124 preferably comprises a browser cache, a plug-in cache and an archive cache similar to the caches according to FIG. 6. The data transfer between the web server 114 and the browser program module 122 preferably occurs with a hypertext transfer protocol. The transfer of measurement data and setting values of the printer to Java applet 126 executed by the browser program 120 occurs with the aid of an RMI communication between the Java applet and the RMI server that is generated by the execution of the firmware 116. The Java applet provides functions for configuration and diagnosis of the printer controller 112 and of the printer in which the printer controller 112 is contained.

Figure 8:
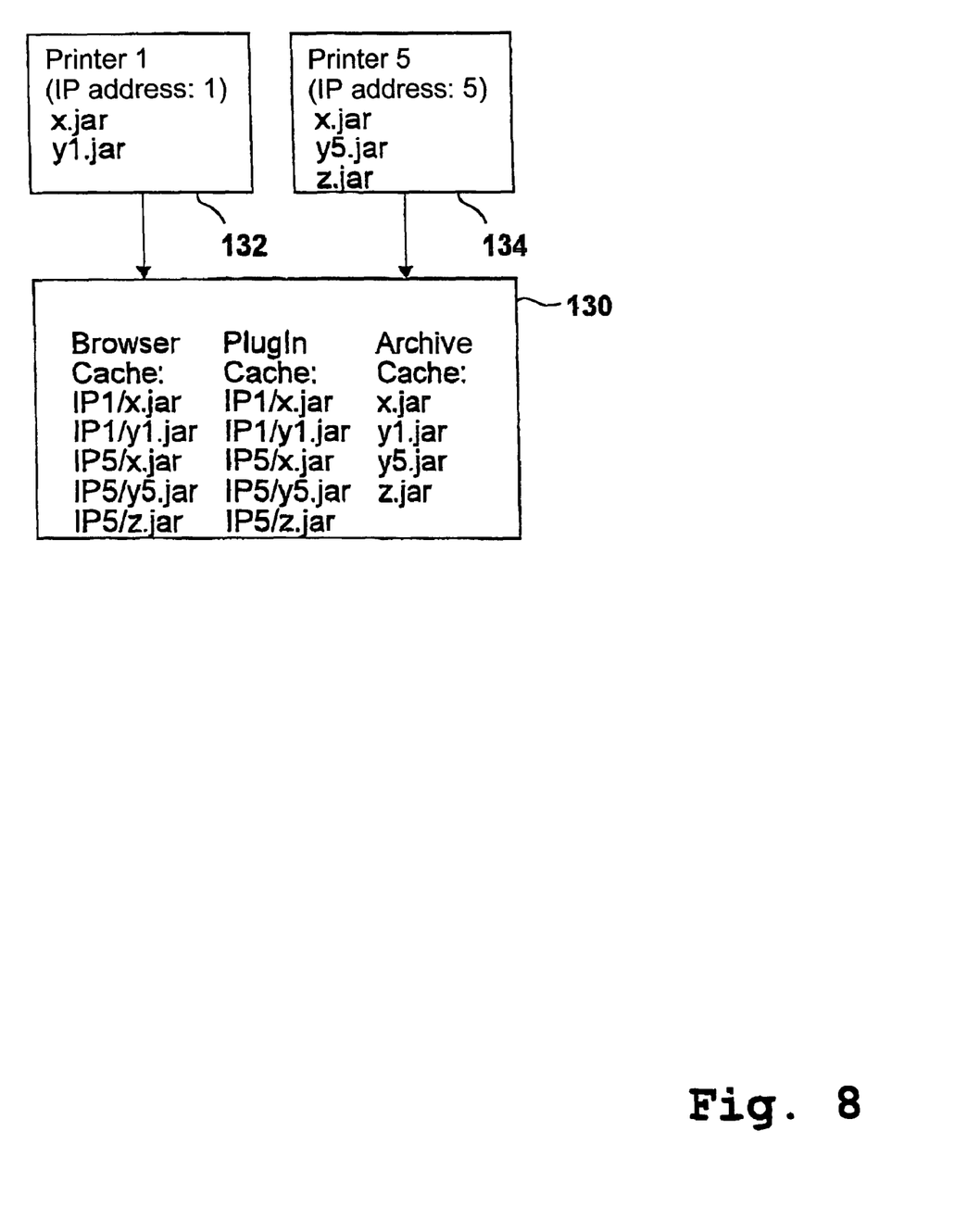
FIG. 8 is a service and maintenance computer that is connected with a first and a fifth printer.

The storage content of the browser cache 98, of the plug-in cache 100 and of the archive cache 82 according to FIG. 6 is respectively shown in FIG. 8. A service and maintenance computer 130 is respectively connected with a first printer 132 and a fifth printer 134 over a data connection. Jar archives are respectively transferred from the printers 132, 134 to the service and maintenance computer in order to provide a graphical user interface as well as operating, configuration, diagnosis and maintenance functions as described in connection with FIG. 6 and FIG. 7. A file "x.jar" and a file "y1.jar" are transferred from the printer 1 to the service and maintenance computer 130. The service and maintenance computer 130 is configured such that the transferred files are stored both in the browser cache, in the plug-in cache and in the archive cache. Both the file "x.jar" and the file "y1.jar" are stored in the browser cache and in the plug-in cache under specification of the network address IP1 of the printer 1. The file "x.jar" and the file "y1.jar" is stored in the archive cache without specification a network address. With the help of the connection between the printer 134 and the service and maintenance computer 130, the files "x.jar", "y5.jar" and "z.jar" are transferred to the service and maintenance computer 130, whereby the files "x.jar", "y5.jar" and "z.jar" are stored in the browser cache and in the plug-in cache under specification of the IP address IP5. The file "x.jar" (which is contained in the printer 134) and the file "x.jar" (which is contained in the printer 132) are identical. Only the files "y5.jar" and "z.jar" are stored in the archive cache of the service and maintenance computer 130 without specification of a network address. If only the archive cache is provided as a single cache for caching of the jar archives, the file "x.jar" must only be transferred once, either from the printer 132 or from the printer 134 to the service and maintenance computer 130.

Figure 9:
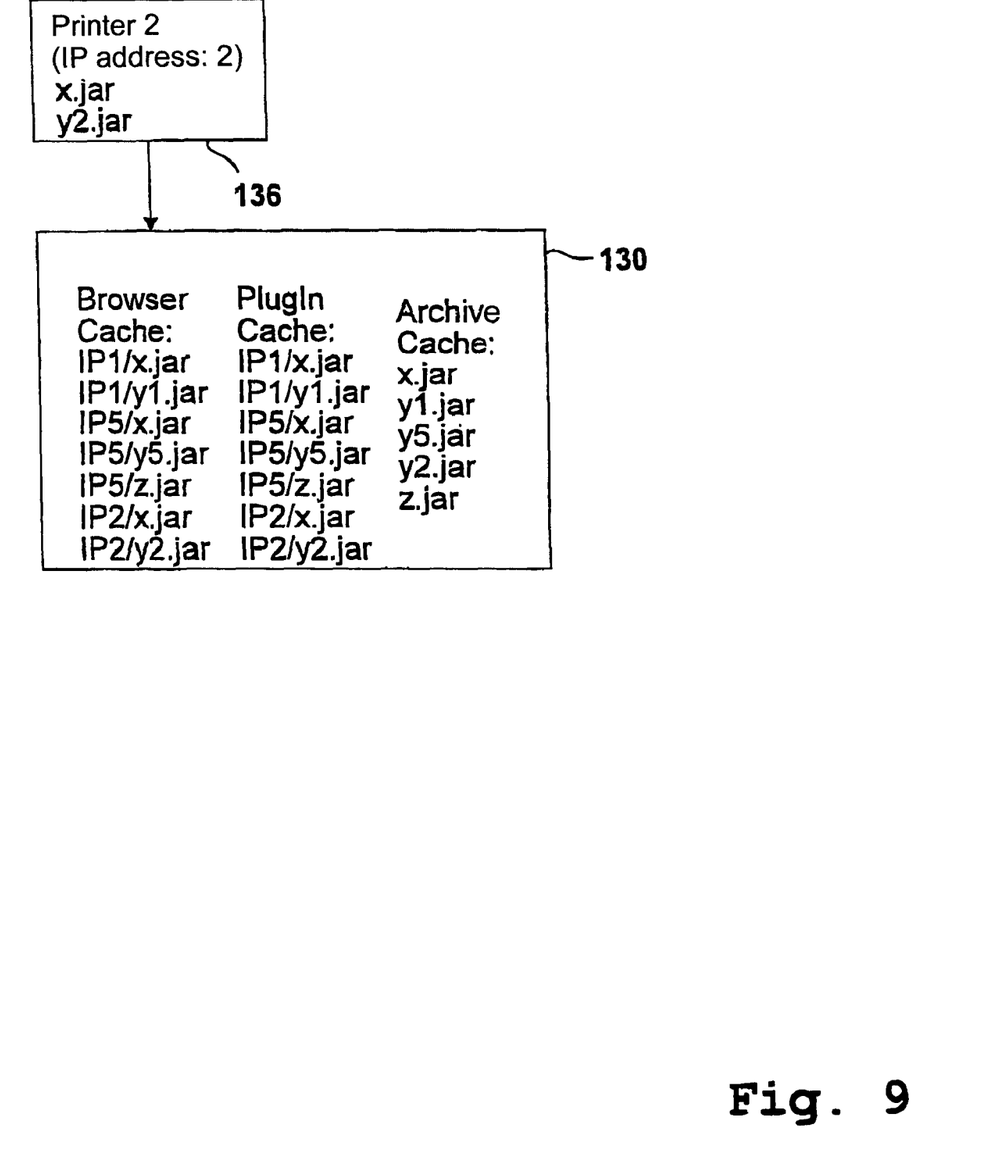
FIG. 9 is a service and maintenance computer that is connected with a second printer.

A block diagram is shown in FIG. 9 in which the service and maintenance computer 130 according to FIG. 8 is connected with a second printer 136. Before the connection of the service and maintenance computer 130 with the second printer 136, the service and maintenance computer 130 has already been connected with the first and fifth printers 132, 134, as already explained in connection with FIG. 8. With the help of the connection between the service and maintenance computer 130 and the second printer 136, the program modules "x.jar" and "y2.jar" are transferred from the printer 136 to the service and maintenance computer 130 and stored in the browser cache and in the plug-in cache under reference to the IP address of the printer 136. However, if (as already explained in connection with FIG. 8) instead of the browser cache and the plug-in cache an archive cache is provided in the preferred embodiment in which the jar archives are stored, only the jar archive "y2.jar" not contained in the archive cache is transferred from the printer 136 to the service and maintenance computer 130.

After the connection of the service and maintenance computer 130 with the printers 132, 134 and 136, seven files with jar archives that have been transferred from the printers 132, 134, 136 to the service and maintenance computer 130 are respectively stored in the browser cache and in the plug-in cache. Only five files are cached in the archive cache, since the files "x.jar" that are stored in the printers 132, 134, 136 coincide and do not have to be transferred multiple times from the printers 132, 134, 136 to the service and maintenance computer 130.

Depending on presets in the browser program module, the data stored in the browser cache and in the plug-in cache are deleted after a predetermined span of time. The data and files contained in the archive cache are at least not automatically deleted. If only the archive cache of the service and maintenance computer 130 is used to store the jar archives, the data quantity to be transferred from the printers 132, 134, 136 to the service and maintenance computer 130 can thus be significantly reduced, whereby wait times are avoided. Via a testing of the necessary versions of the jar archives and of the versions of the jar archives stored in the archive cache, it is ensured that the necessary jar archives are loaded and subsequently processed by the browser program module of the service and maintenance computer 130.

Figure 10:
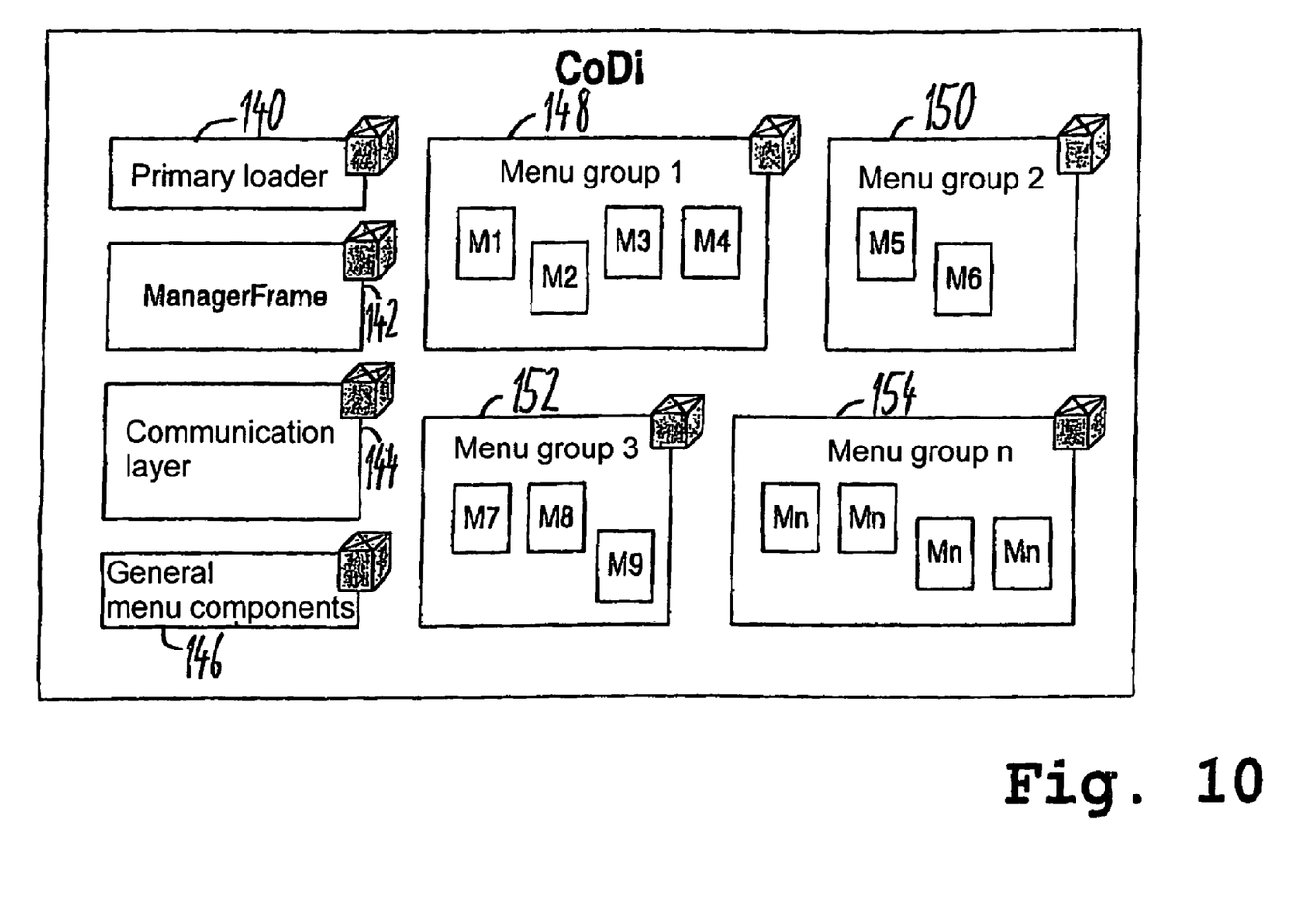
FIG. 10 shows a program data archive for generation of a graphical user interface for configuration and diagnosis.

A block diagram with jar archives for generation of a graphical user interface for configuration and diagnosis of an electrophotographic printer is shown in FIG. 10. As already mentioned, the jar archives contain Java applets and/or Java applications as well as further program data necessary for execution of applets and applications. A first jar archive 140 contains at least one Java applet via which a primary loader function is provided. A second jar archive 142 contains at least class data or program data for administration of data of the printer in the browser program module. A third jar archive 144 contains at least class or program data for provision of communication functions, whereby what is known as a communication layer is generated. The functions needed by the communication layer are provided by the class or program data contained in the jar archive 142.

Furthermore, a jar archive 146 is provided that contains at least class or program data for generation of general menu components and the graphic structuring of the graphical user interface. These general menu components access functions of the communication layer. Furthermore, jar archives 148, 150, 152 and 154 are provided that respectively (with the aid of class and program data) provide a menu group and functions of menu points that can be individually invoked. The menu groups 148 through 154 access functions of the general menu components 146. Furthermore, the menu group 152 directly accesses the communication layer 144. The menu groups 148 through 154 have no dependency upon one another.

After the connection of the service and maintenance computer with the printer, the jar archive 140 that contains a relatively small data quantity is transferred. As already mentioned, the jar archive 140 contains the primary loader and furthermore contains printer-specific data. The further jar archives 142 through 154 necessary for generation of the graphical user interface are preferably loaded from the each cache 82. The archive cache 82 is located on a fixed disc storage of the service and maintenance computer. These data can thereby be transferred very quickly to the browser program module.

The jar archive 142 "ManagerFrame" for administration of data and the jar archive 144 for communication as well as for authentication are subsequently loaded. Further jar archives 146 through 154 are only loaded after a successful authentication. In the generation of the general menu components with the help of the jar archive 146, information are used that are stored in the printer and are based on settings of an already-configured user interface. The jar archives 148 through 154 are only transferred to the browser program module after a function contained in the respective menu group has been requested via the graphical user interface. Further jar archives can also be transferred from the printer to the service and maintenance computer that are currently not needed by the browser program module for generation of the graphical user interface. This transfer of the data preferably occurs at points in time in which no further data are to be transferred from the printer to the service and maintenance computer. All jar archives transferred from the printer to the service and maintenance computer are preferably stored in the archive cache 82 when the archives are not yet contained in the archive cache 82 or are only contained in the archive cache 82 in a different program version.

Data can also be transferred from the printer to the service and maintenance computer that contain Java applications, whereby the execution of these Java applications occurs with the help of what is known as a Java Web start technology. In the Java Web start technology, an execution of the Java applet or a Java application occurs not with the help of a browser program module, but rather via execution of a Java network launching protocol file. The applet or application loaded by the Web server is thereby executed as a local application on the data processing system of the operating unit or of the service notebook. In particular wired and wireless data connections such as Bluetooth, UMTS and DSL are used as data lines for transfer of data.

Although preferred exemplary embodiments are shown and described in detail in the drawings and in the preceding specification, these should be viewed as purely exemplary and not as limiting the invention. It is noted that only the preferred exemplary embodiments are shown and described, and all variations and modifications that presently and in the future lie within the scope of protection of the invention should be protected.

We claim as our invention:

1. A method for loading a program data for a graphical user interface for operation or for diagnosis of a printer or copier, comprising the steps of:
    transferring specification data stored in a first storage region of an internal control unit of the printer or copier from said internal control unit over a network to an external operating unit for the printer or copier which is external to the printer or copier with aid of a browser program module of the external operating unit and executed by the external operating unit, said external operating unit also having a browser module cache and an archive cache, the specification data containing at least a specification about at least one necessary program module necessary for generation of operating or diagnosis functions for said printer or copier;
    with help of the external operating unit, checking whether program data that contains said necessary program module are contained in said archive cache of the external operating unit in which program data are stored and read out independent of a network address of the printer or copier, and wherein a version state of the necessary program module stored as program data in said archive cache is compared with a desired version state of the necessary program module; and
    if the program data in the archive cache does not contain said necessary program module of the desired version state, transferring program data which contain said necessary program module of the desired version state from a further storage region of said internal control unit to the external operating unit and storing the program data with said necessary program module of the desired version state in the archive cache of the external operating unit; and
    executing instructions of said necessary program module by the external operating unit.

2. A method according to claim 1 wherein the external operating unit and also a service and maintenance computer as another external operating unit are connected with said internal control unit of said printer or copier via respective data connections.

3. A method according to claim 1 wherein the program data stored in the archive cache are not automatically deleted, dependent on settings in the browser program module.

4. A method according to claim 1 wherein program data of a plurality of program modules are contained in the archive cache of the external operating unit, said program data being loaded and executed by the external operating unit independent of the network address of the printer or copier.

5. A method according to claim 1 wherein the archive cache is at least part of a storage region of a fixed disk storage or of an exchangeable data medium.

6. A method according to claim 1 wherein said specification data contain at least a printer or copier type or an output state of the printer or copier.

7. A method according to claim 1 wherein a plurality of program modules are stored in the archive cache, a program module being selected with aid of the specification data.

8. A method according to claim 1 wherein the specification data contain a program module with whose execution further specification data and still further specification data are loaded, whereby the specification data contain a program module for communication control between the internal control unit and the external operating unit, and a program module for provision of operating for diagnosis functions, and wherein the specification data are contained in at least one file.

9. A method according to claim 8 wherein the specification data or said program data contain a JAVA applet or an ActiveX program element.

10. A method according to claim 1 wherein the internal control unit is connected with a service and maintenance computer external to the printer or copier over a remote data transfer connection.

11. A method according to claim 10 wherein the remote data transfer connection comprises a point-to-point connection.

12. A method according to claim 1 wherein the specification data or the program data contain a primary loaded program, printer-specific information, program modules for an RMI communication, program modules for implementation of an authentication, program modules for generation of a graphical user interface, program modules for access to a data bank of the printer or copier, program modules for a diagnosis of a paper input unit, a paper path controller, a paper output unit, or a printing unit, and program modules for access to an event registration or program modules for access to an error storage.

13. A method according to claim 1 wherein the specification data or the program data contain Java applications that are transferred with aid of a Java Web Start Technology in the external operating unit and executed by the external operating unit.

14. A method according to claim 1 wherein the program data contain program elements for adjustment of parameters, counter values, counter limit values, voltage levels to be set, status information as well as program elements for implementation of light barrier routines, motor test routines, and valve routines.

15. A method according to claim 1 wherein said archive cache comprises a CD-ROM storage in which a plurality of program data for different printers is stored independent of network address of printers.

* * * * *